United States Patent [19]

Durney

[11] Patent Number: 5,676,498
[45] Date of Patent: Oct. 14, 1997

[54] IN-LINE MULTIPLE SPINDLE BORING APPARATUS

[75] Inventor: Max W. Durney, Penngrove, Calif.

[73] Assignee: Castle Tool Machinery Incorporated, Petaluma, Calif.

[21] Appl. No.: 519,542

[22] Filed: Aug. 25, 1995

[51] Int. Cl.⁶ .................................................. B23B 47/04
[52] U.S. Cl. ...................................... 408/47; 408/53
[58] Field of Search ............................. 408/47, 53, 124, 408/128

[56] References Cited

U.S. PATENT DOCUMENTS

| | | | |
|---|---|---|---|
| 1,326,863 | 12/1919 | Heinkel | 408/47 |
| 3,687,564 | 8/1972 | Cupler, II | 408/47 |
| 3,813,951 | 6/1974 | Zagar | 408/47 |
| 4,260,301 | 4/1981 | Reiman | 408/47 |

FOREIGN PATENT DOCUMENTS 1042344  10/1958  Germany ............................. 408/47

*Primary Examiner*—Daniel W. Howell
*Attorney, Agent, or Firm*—Flehr Hohbach Test Albritton & Herbert LLP

[57] ABSTRACT

A multiple spindle drilling apparatus (10) having an eccentric drive link (11), and a primary drive mechanism (12) coupled to the drive link (11) in an eccentric off-set manner. This eccentric off-set causes eccentric circular motion of the drive link (11) about a predetermined radius (R). A frame member (15) is included, as well as a plurality of in-line spindle units (16) rotatably mounted to the frame member (15) for rotation about corresponding spindle axis (17) thereof. An off-set coupling (21) is rotatably mounted between the drive link (11) and respective crank members (20) mounted to corresponding spindle drive shafts (22) to drive the spindle about the spindle axis (17). The coupling (21) is eccentrically off-set from the spindle axis by a radial distance substantially equivalent to the predetermined radius, and further in-phase with the eccentric off-set of the drive link (11).

24 Claims, 13 Drawing Sheets

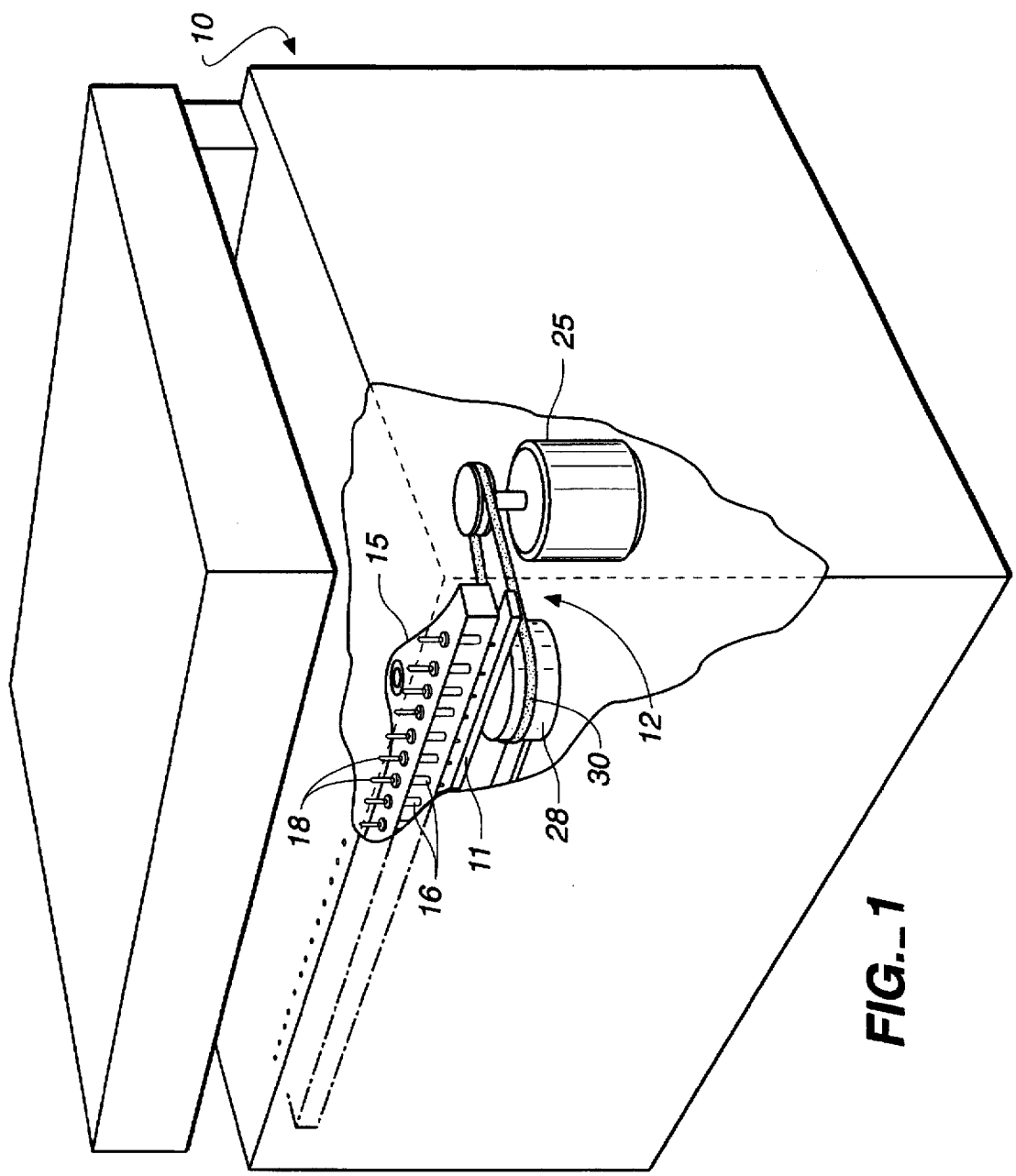
FIG._1

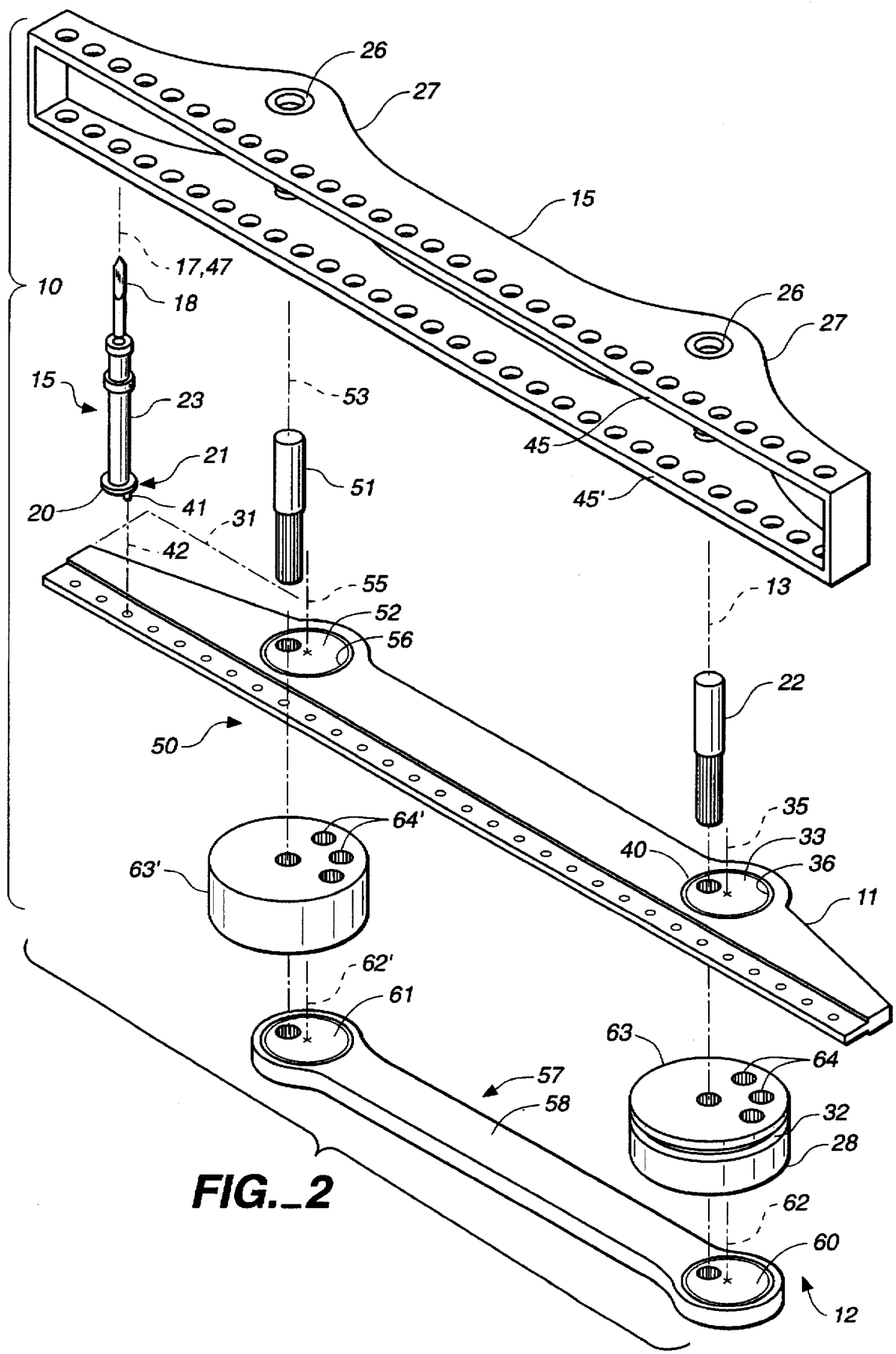
FIG._2

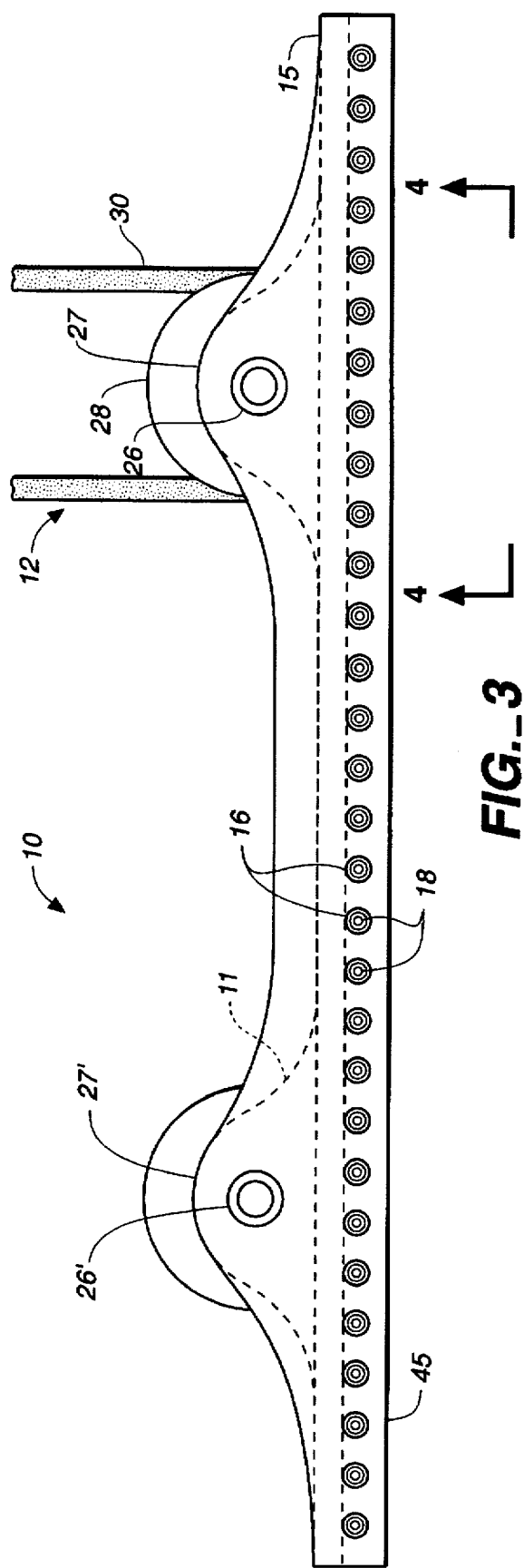
FIG._3

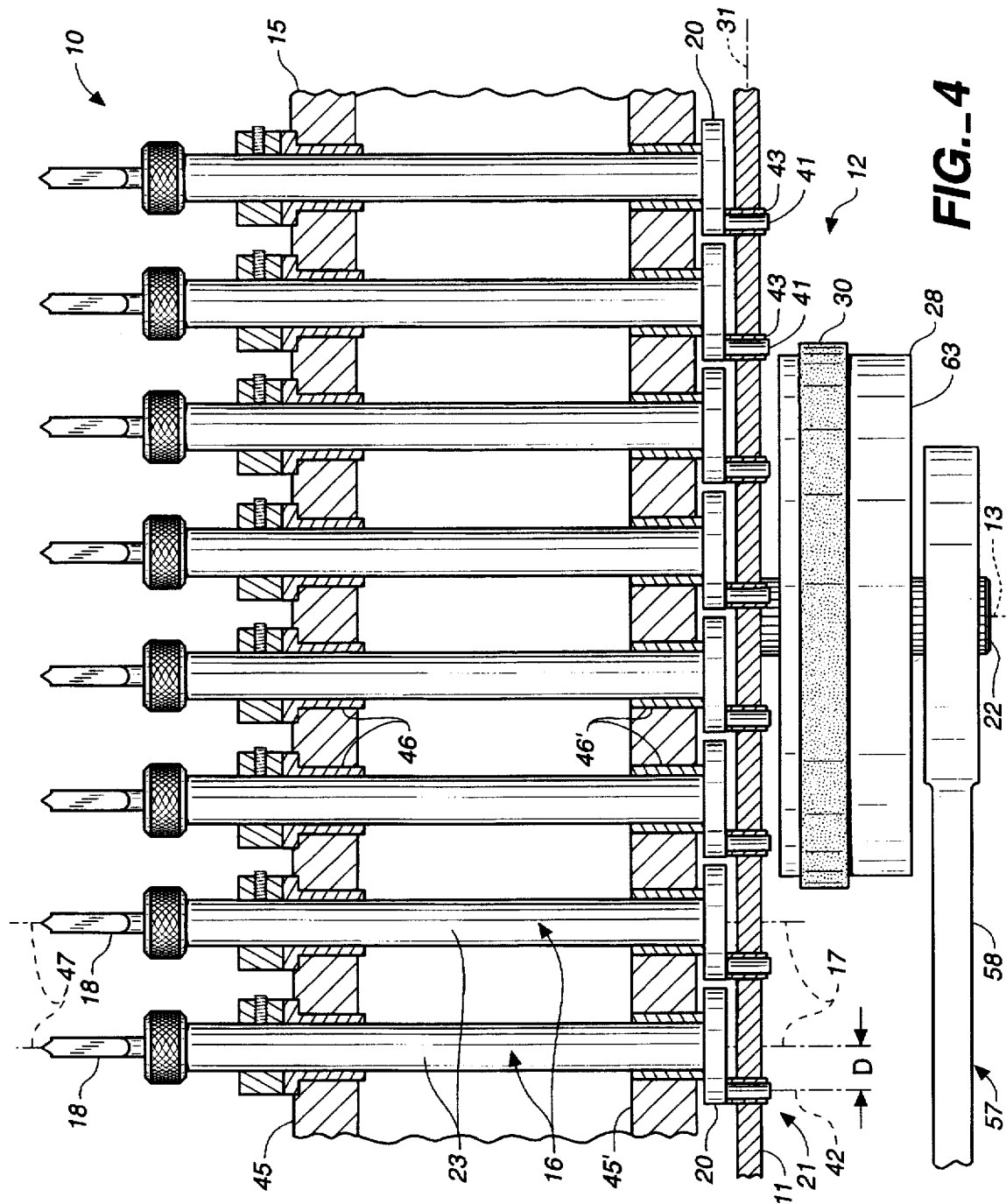

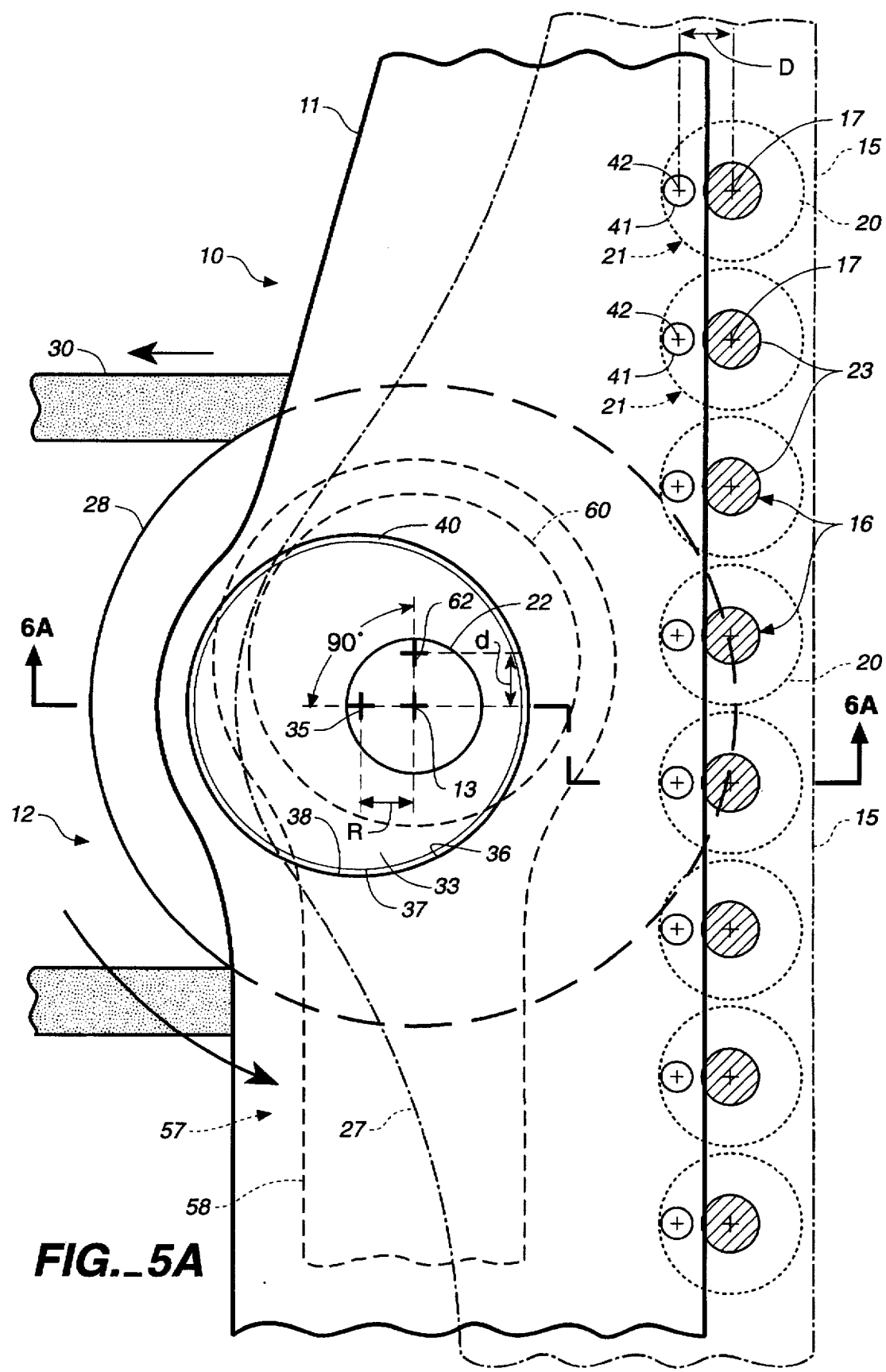
FIG._5A

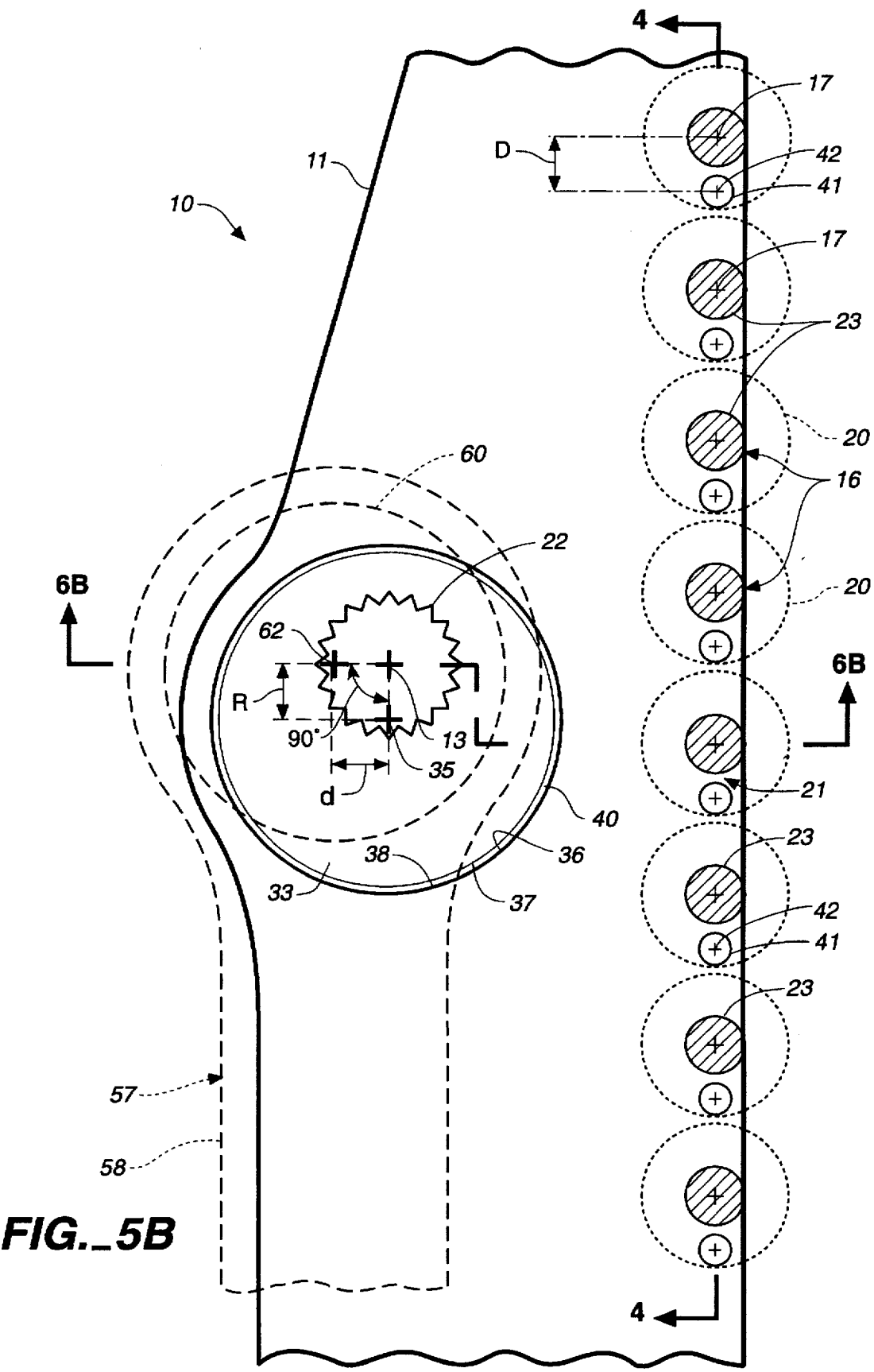
FIG._5B

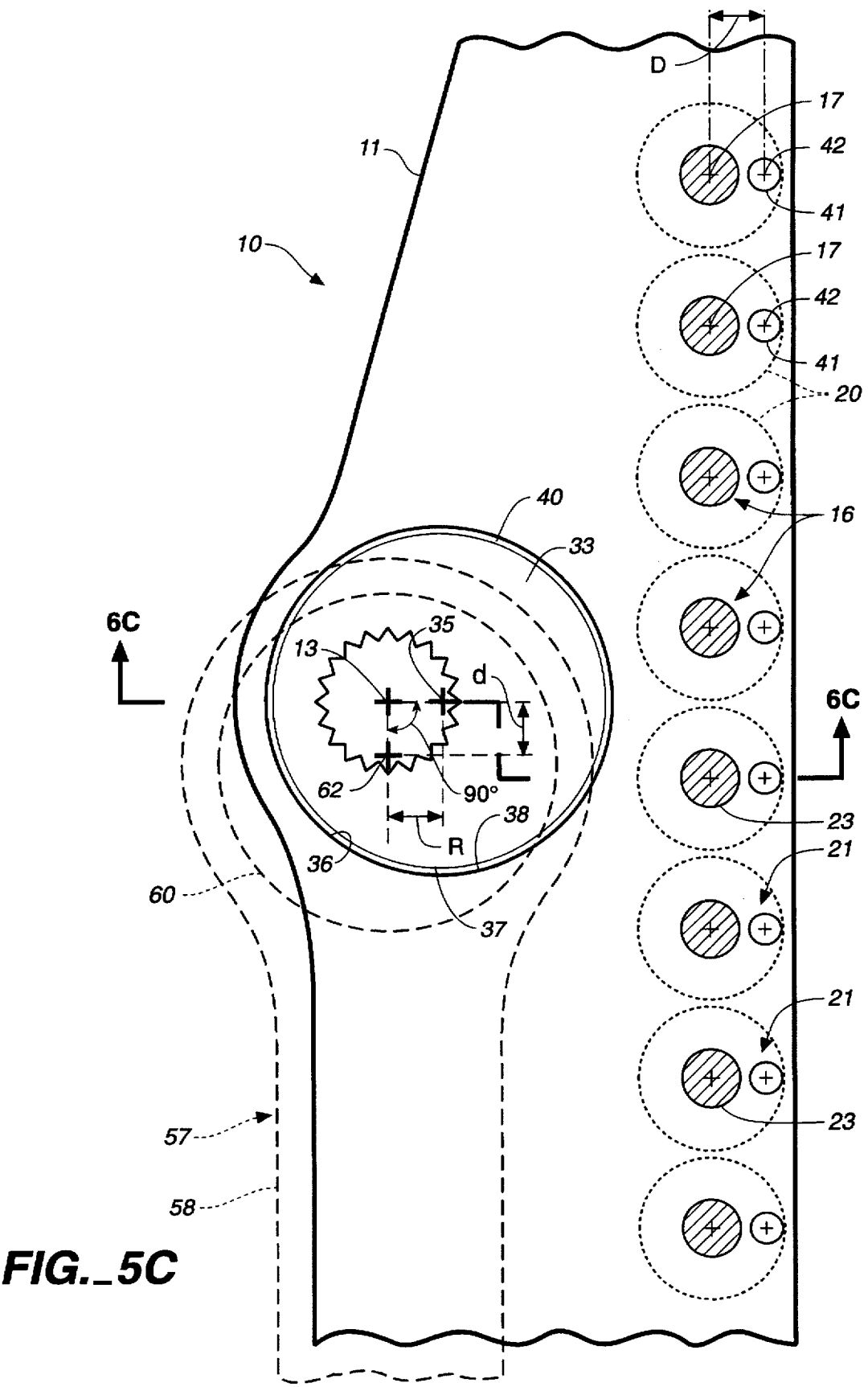
FIG._5C

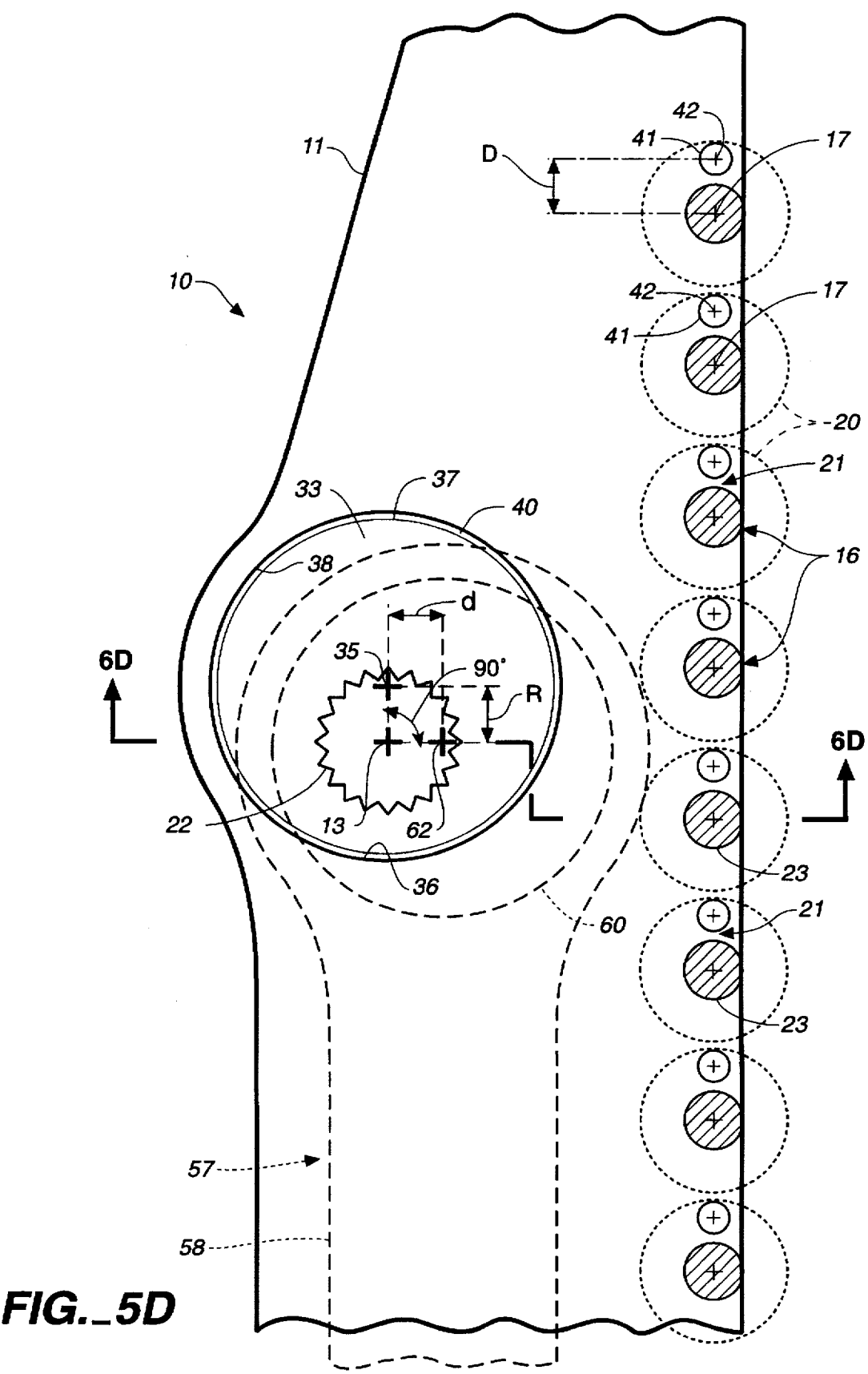
FIG._5D

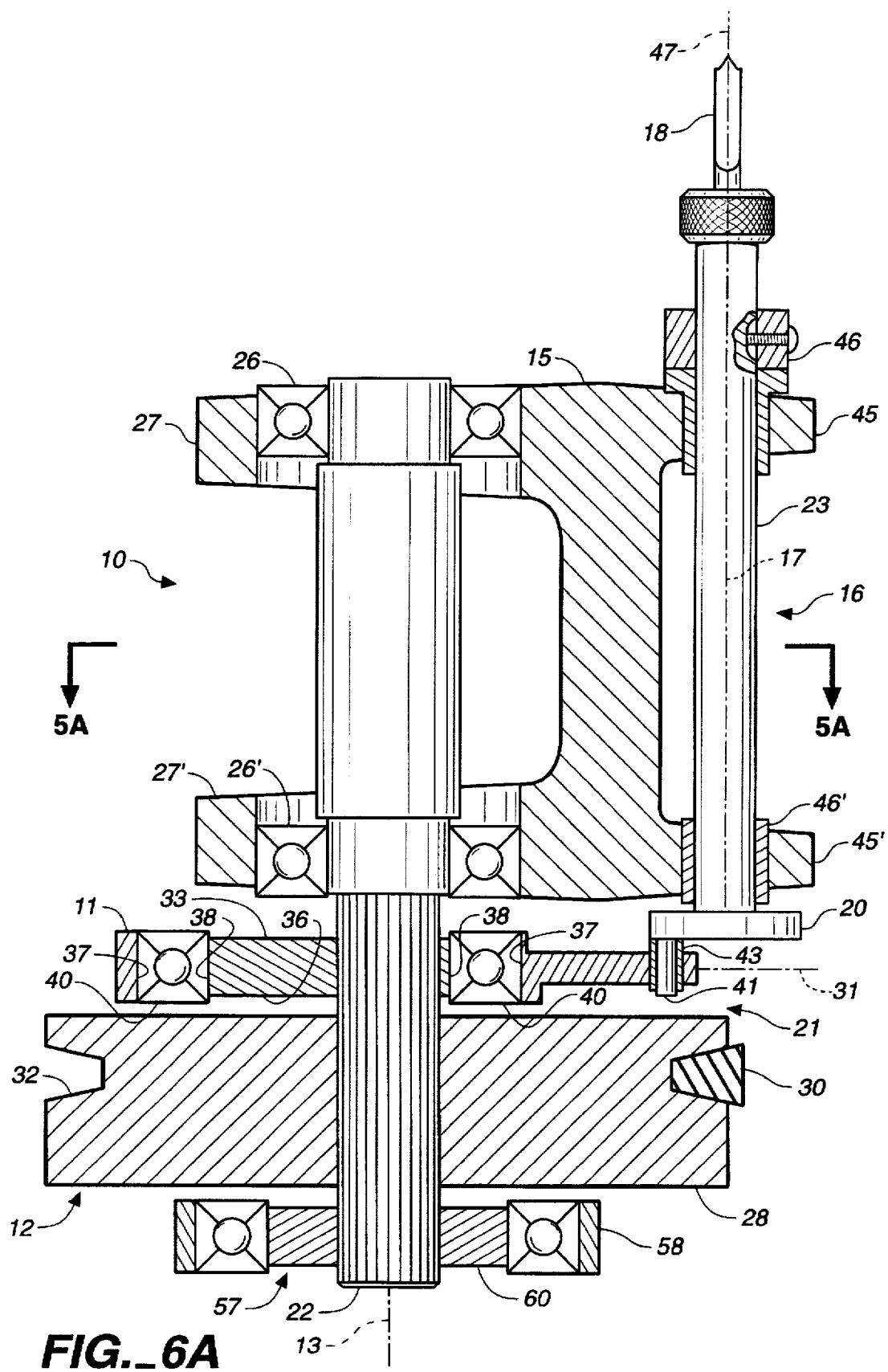
FIG._6A

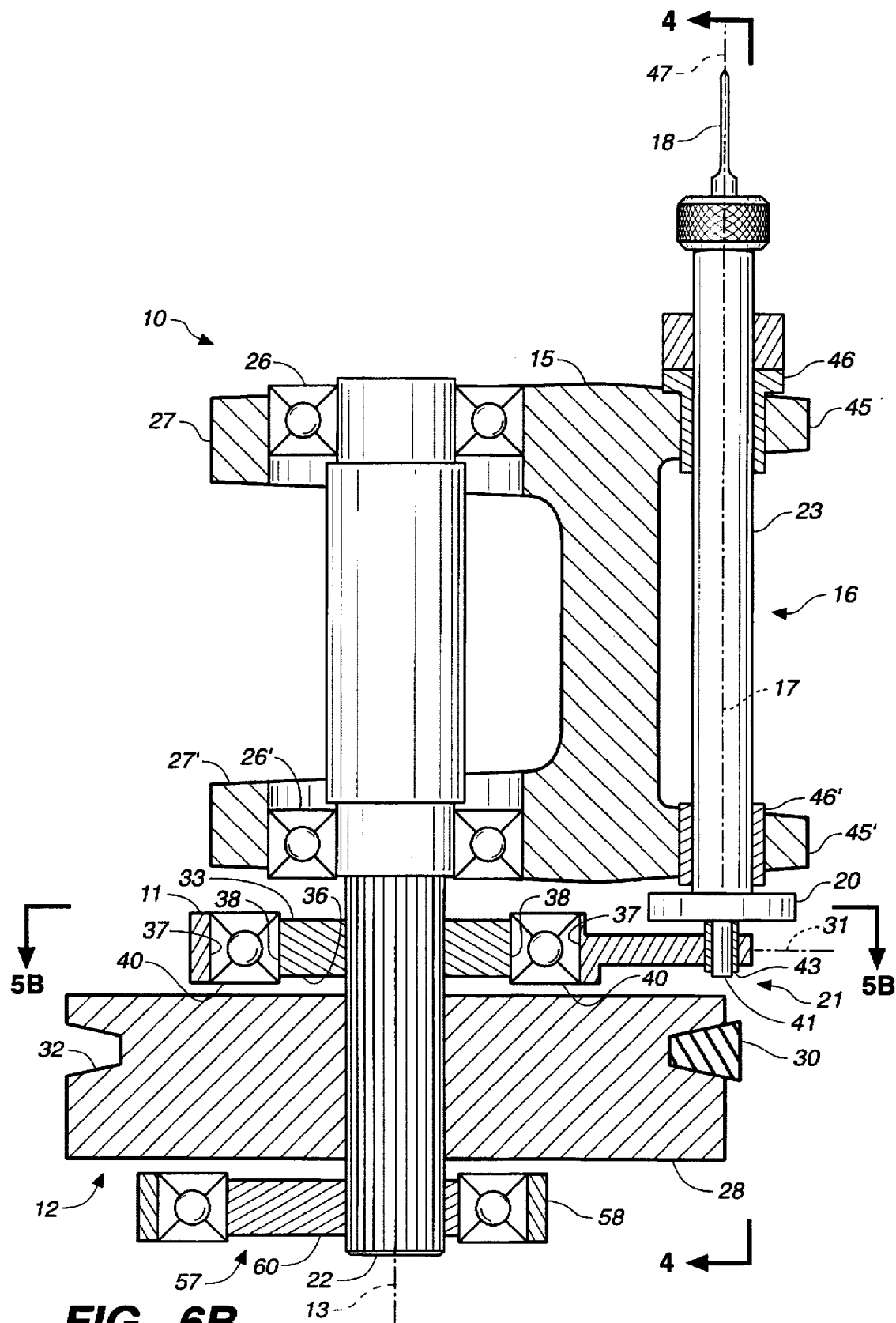
FIG._6B

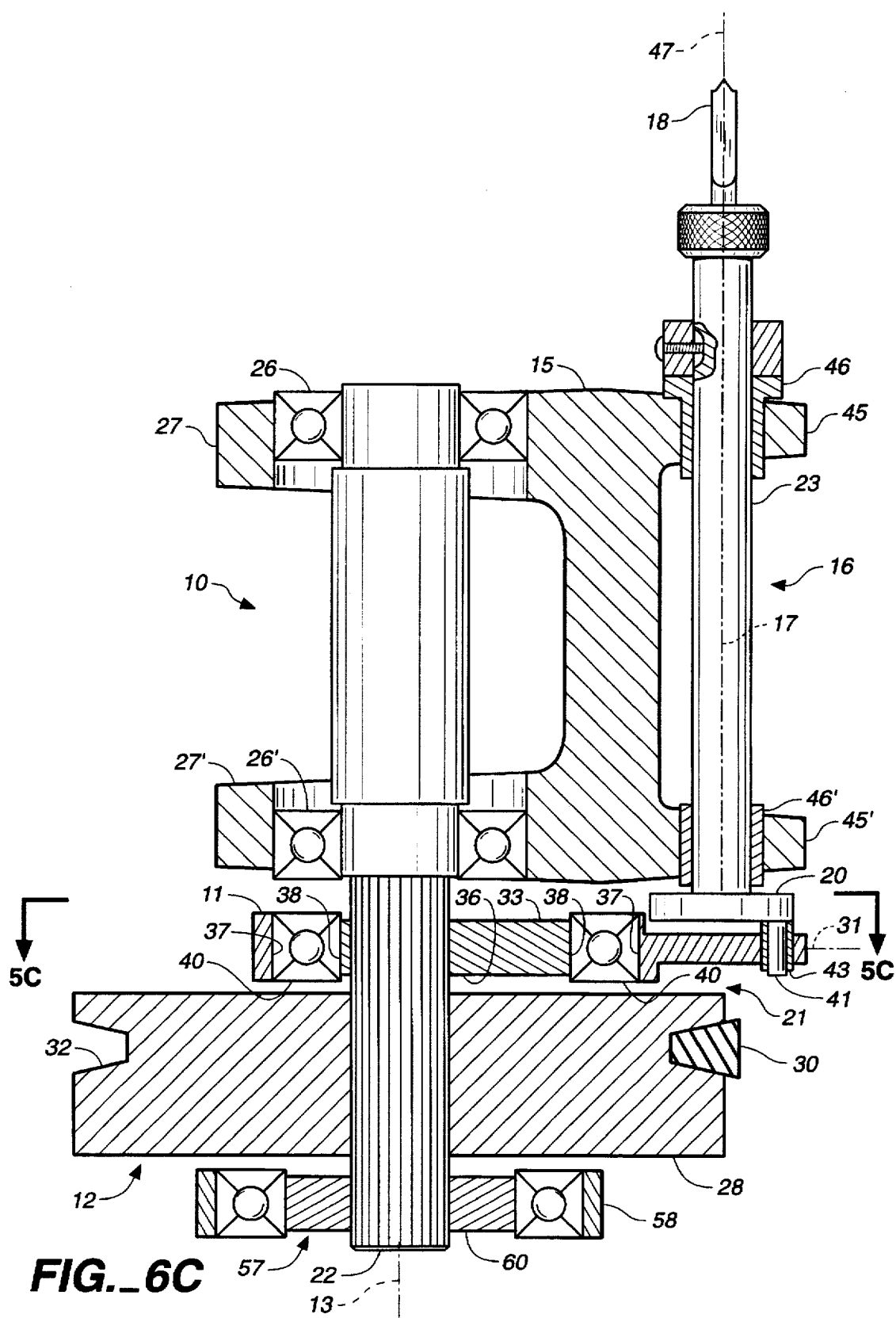
FIG._6C

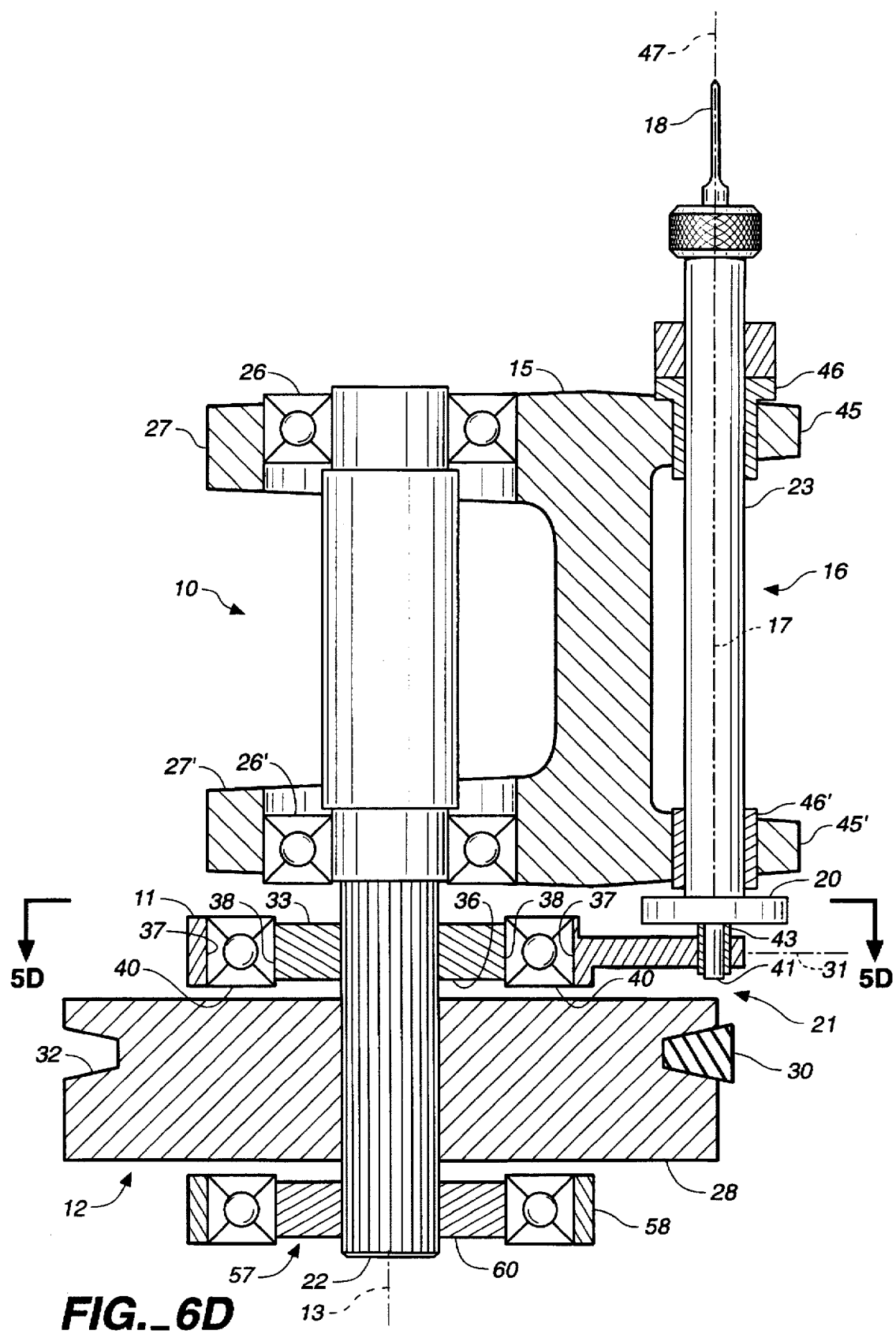
FIG._6D

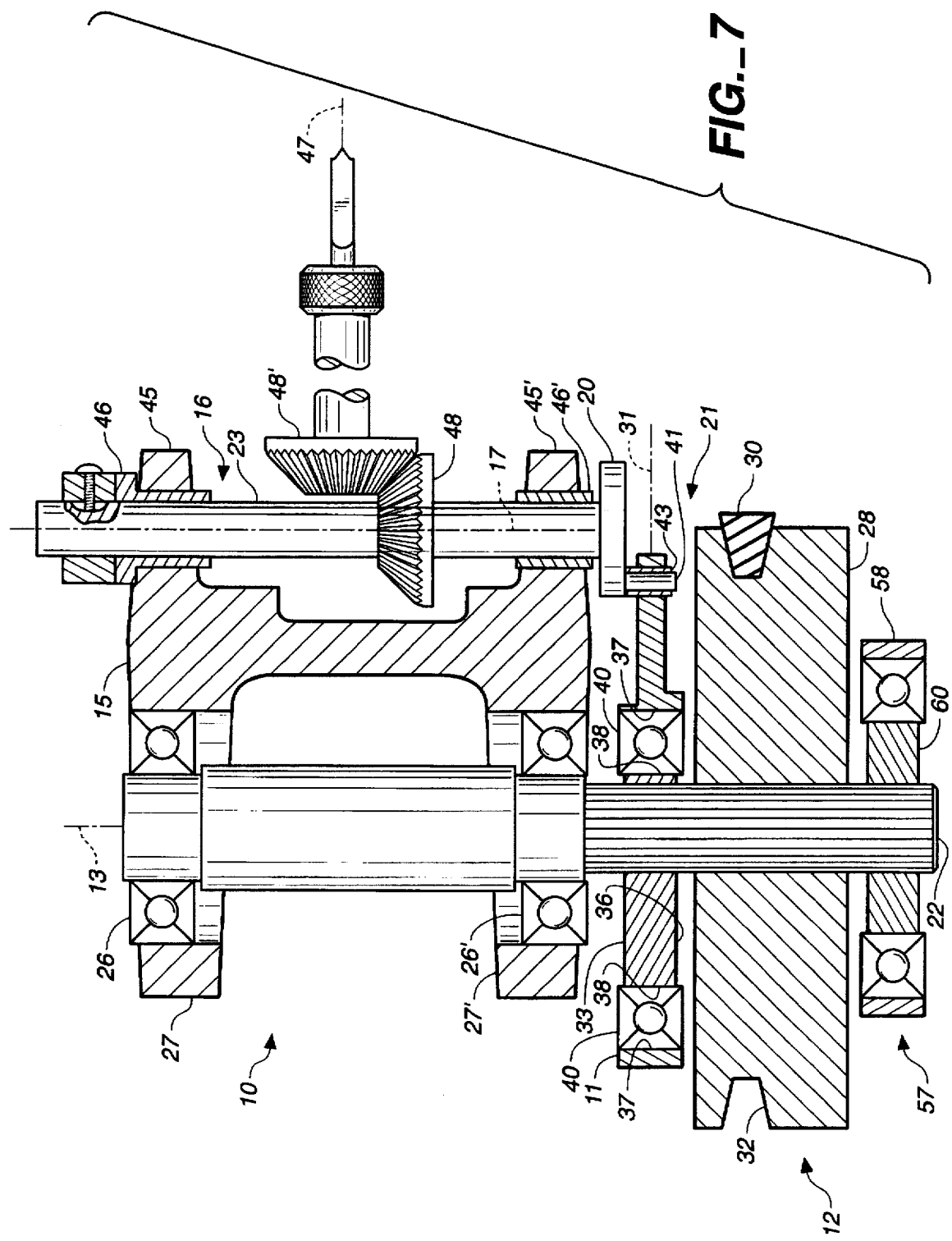

IN-LINE MULTIPLE SPINDLE BORING APPARATUS

TECHNICAL FIELD

The present invention relates, generally, to drilling and boring apparatus and, more particularly, relates to in-line multiple spindle drilling apparatus.

BACKGROUND ART

Multiple spindle boring tools have many useful manufacturing applications. For example, pattern boring and 32 mm line boring is very useful in the furniture and shelving manufacturing industries. In either application, each drill spindle is typically driven by a common motor assembly operationally linked through a set of satellite gears and/or gear train.

While these techniques are capable of satisfactorily driving a reasonable number of spindles, problems occur when this number exceeds the capability of the linkage assembly. For example, in 32 mm line boring, as many as 26 spindles may be operationally driven from a single motor assembly.

Typically, each consecutive gear is serially arranged and connected in a side-by-side manner. Each adjacent spindle, therefore, rotates in the opposite direction from one another which poses certain safety hazards and requires left and right tooling. This physical arrangement causes bearing and gear pressures to compound or stack at and near the point of power input which prematurely wear or cause failure thereof. This is particularly problemsome for the gear and bearing components located serially closer to the motor assembly. Further, this stacking of forces decreases the gear trains efficiency which consumes operational power.

One solution is to increase the load capacity of the gear and bearing components through reinforcement or composition changes. As a consequence, however, there may be spacial disadvantages for closely spaced spindles arrangements, and the overall compactness of the apparatus is compromised. Further, more exotic materials may present manufacturing problems, and are typically less cost effective.

Another approach for powering multiple drill spindles includes the use of flexible belts and pulleys. Typically, each drill spindle includes a drive pulley coupled to a drive belt which interconnects all the spindles to a common motor assembly. The problem associated with this belt and pulley arrangement, similarly, is that when the number of spindles to be driven is too great, the tension exerted on the belt substantially increases. As a result, there are problems maintaining belt tension because of belt stretch and failure thereof.

Chain drives may be employed for larger capacity, but these assemblies are more costly, requiring oil baths and/or high maintenance, and are spatially limited.

Worm or helical gear techniques may be also employed for in-line boring. These arrangements, however, are generally power inefficient because of gear inefficiency. Further, the elongated helical gears are costly to manufacture, and difficult to align and maintain.

DISCLOSURE OF INVENTION

Accordingly, it is an object of the present invention to provide a multiple spindle boring apparatus capable of simultaneously boring a relatively large number of holes in a workpiece.

Yet another object of the present invention is to provide a multiple spindle boring apparatus which is energy efficient.

Still another object of the present invention is to provide a multiple spindle boring apparatus capable of in-line boring.

Another object of the present invention is to provide a multiple spindle boring apparatus capable of patterned hole boring.

It is a further object of the present invention to provide a multiple spindle boring apparatus which is durable, compact, easy to maintain, has a minimum number of components, cost effective to manufacture, and is easy to use by unskilled personnel.

In accordance with the foregoing objects, a spindle apparatus is provided for rotating a tool including an eccentric plate, and a primary drive mechanism coupled to the plate in an eccentric off-set manner from a drive axis of the primary drive mechanism. This eccentric off-set causes eccentric circular motion of the plate, relative the drive axis, about a predetermined radius. A frame member is included, as well as a spindle unit rotatably mounted to the frame member for rotation about a spindle axis thereof. The spindle unit has a tool bit mounted to one end and a crank member mounted at the other end thereof. The boring apparatus of the present invention further includes an off-set coupling rotatably mounted between the eccentric plate and the crank member to drive the spindle about the spindle axis. The coupling is eccentrically off-set from the spindle axis by a radial distance substantially equivalent to the predetermined radius. Further, the eccentric off-set of the coupling is in-phase with the eccentric off-set of the drive link.

The preferred boring apparatus includes a plurality of spindle units each rotatably mounted to the frame member for rotation about a respective spindle axis thereof. Similarly, each spindle unit includes a tool bit mounted to one end and a crank member mounted at the other end thereof. A plurality of respective off-set couplings are each rotatably mounted between the eccentric plate and a corresponding crank member to drive each spindle about a respective spindle axis. Each link is eccentrically off-set from the corresponding spindle axis by a radial distance substantially equivalent to the predetermined radius, and the eccentric off-set of each link is in-phase with the eccentric off-set of the drive link.

A counter balance is included coupled to the primary drive mechanism in an eccentric off-set manner from the drive axis to cause circular motion of the counter balance thereabout. The eccentric off-set of the counter balance with the drive axis is out-of-phase with the eccentric off-set of the eccentric drive link with the drive axis.

BRIEF DESCRIPTION OF THE DRAWING

The assembly of the present invention has other objects and features of advantage which will be more readily apparent from the following description of the best mode of carrying out the invention and the appended claims, when taken in conjunction with the accompanying drawing, in which:

FIG. 1 is a top perspective view of a multiple spindle boring apparatus constructed in accordance with the present invention.

FIG. 2 is an enlarged exploded view of the primary components of the multiple spindle boring apparatus of FIG. 1.

FIG. 3 is a fragmentary, enlarged, top plan view of the eccentric drive link and the primary drive mechanism of the boring apparatus of FIG. 1.

FIG. 4 is a fragmentary, enlarged, side elevation view, in cross-section, of the multiple spindle boring apparatus taken substantially along the plane of line 4—4 in FIG. 3.

FIGS. 5A and 5D is a sequence of fragmentary, enlarged, top plan views, in cross-section, of the boring apparatus taken substantially along the plane of line 5—5 in FIGS. 6A and 6D, respectively, illustrating relative movement between the eccentric drive link and the counter balance.

FIGS. 6A and 6D is a sequence of fragmentary front elevation views, in cross-section, of the boring apparatus taken substantially along the plane of line 6—6 in FIGS. 5A and 5D, respectively.

FIG. 7 is a fragmentary, enlarged, side elevation view, in cross-section, of an alternative embodiment of the boring apparatus of the present invention.

BEST MODE OF CARRYING OUT THE INVENTION

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Attention is now directed to FIGS. 1–4 where an apparatus, generally designated 10, of the present invention is illustrated for rotating a tool bit which includes an eccentric drive link, generally designated 11, and a primary drive mechanism 12 coupled to drive link 11 in an eccentric off-set manner from a drive axis 13 of primary drive mechanism 12 to cause eccentric circular motion of plate 11, relative the drive axis 13, of a predetermined radius (R). The boring apparatus further includes a frame member 15, and a spindle unit, generally designated 16, rotatably mounted to frame member 15 for rotation about a spindle axis 17 thereof. Spindle unit 16 includes a tool bit 18, preferably a drill bit, mounted to one end, and a crank member, generally designated 20, mounted to the other end thereof. An off-set coupling 21 is rotatably mounted between eccentric drive link 11 and crank member 20 to drive spindle unit 16 about spindle axis 17. As shown in FIGS. 5A–5B, off-set coupling 21 is eccentrically off-set from the spindle axis 17 by a radial distance (D) substantially equivalent to the predetermined radius (R). Further, the eccentric off-set of off-set coupling 21 is in-phase with the eccentric off-set of drive link 11. In other words, the eccentric stroke and phase are substantially similar.

Accordingly, the present invention provides a boring technique which translates rotational motion of a drive shaft 22 of primary drive mechanism 12 to circular motion (FIGS. 5A–5D) of eccentric drive link 11. Subsequently, this circular movement of drive link 11 is translated back to rotational motion of a spindle shaft 23, at a spaced distance from drive shaft 22, to provide operation of drill bit 18. This translation is accomplished by providing circular motion of eccentric drive link 11, in combination with an off-set of crank member 20, to drive spindle unit 16 about a spindle axis. Such an arrangement advantageously enables a wide variety of spindle spacings and positions.

In the preferred form, however, boring apparatus is particularly suited for simultaneous operation of evenly spaced multiple spindles. FIGS. 4–6 illustrate a plurality of spindle units 16 each rotatably mounted to frame member 15 for rotation about a respective spindle axis 17 thereof. Each spindle unit 16 includes a drill bit 18 mounted to one end, and a crank member 20 mounted at the other end thereof. A plurality of respective off-set couplings 21 are each rotatably mounted between the eccentric drive link 11 and a corresponding crank member 20 to drive each spindle unit 16 about a respective spindle axis 17. Each off-set coupling 21 is eccentrically off-set from the corresponding spindle axis 17 by a radial distance substantially equivalent to the predetermined radius (R). Further, the eccentric off-set of each off-set coupling 21 is in-phase with the eccentric off-set of drive link 11.

Hence, the circular motion of eccentric drive link 11 enables the simultaneous operation of a plurality of spindles units driven by a common drive source without the debilitating stacking of forces experienced by the prior art gear trains. As a result, more spindle units may be operationally driven using less power. Moreover, as will be apparent, the present invention is capable of simultaneous, multiple spindle, in-line boring as well as simultaneous, multiple spindle, pattern boring without requiring complex gear train arrangements. The spindle units can be caused to rotate anywhere along the eccentric drive link. Preferably, however, the multiple spindle units 16 of boring apparatus 10 are arranged in-line and closely spaced for concentrated drilling of holes. That is, the holes are aligned substantially in a side-by-side alignment.

Primary drive mechanism 12 is preferably provided by an electric motor 25 coupled to a drive shaft 22. As shown in FIGS. 6A–6D, drive shaft 22 is rotatably mounted to elongated frame member 15 which is H-shaped in cross-sectional dimension. Upper ball bearings 26 and lower ball bearings 26' are included which rotatably couple drive shaft 22 to a respective upper flange portion 27 and lower flange portion 27' of H-shaped frame member 15.

A pulley 28 is provided which couples electric motor 25 to drive shaft 22. The pulley may be mounted to drive shaft 22 below the lower flange portion 27' of frame member 15, and includes a conventional V-shaped groove 32 formed for frictional contact with belt 30 therewith. Accordingly, as belt 30 is driven by electronic motor 25 (FIG. 1), pulley 28 is caused to rotate, which in turn rotatably drives shaft 22 about drive axis 13.

As set forth above, eccentric drive link is coupled to drive shaft 22 in a manner translating the shaft rotational motion into circular motion of the drive link, in a generally horizontal plane 31 which, is substantially perpendicular to drive axis 13. This circular motion is accomplished by providing a main eccentric 33 mounted to drive shaft 22 which rotates about drive axis 13 in an eccentric path or stroke, and includes a main eccentric axis 35 substantially parallel to drive axis 13.

As best shown in FIGS. 5A–5D, main eccentric axis 35 is off-set from drive axis 13 by predetermined radius (R) (approximately about 10 mm). Hence, as the main eccentric rotates about drive axis 13, the eccentric stroke thereof causes the drive link to move in a circular motion (comparing FIGS. 5A–5D).

Drive link 11 preferably provides a main bore 36 extending therethrough which is formed and dimensioned for rotatable receipt of main eccentric 33 therein. Accordingly, by coupling main eccentric 33 to eccentric drive link 11 in bearing relationship, upon eccentric motion of the main eccentric about the drive axis, the outward facing wall 37 of main eccentric 33 slidably engages the inward facing wall 38 forming main bore 36. Hence, the eccentric stroke of main eccentric 33 and its bearing engagement with drive link 11 causes the circular motion thereof.

In the preferred embodiment, main eccentric 33 is rotatably coupled to drive link 11 through a ball bearing-type coupling 40 or the like positioned between outward facing wall 37 and the inward facing wall 38 for a substantial friction-free contact. Conventional sleeve bearing contact, however, may be suitably employed as well.

In accordance with the present invention, the circular motion of drive link 11 is subsequently translated back into rotational motion at each spindle shaft 23. It will be noted that as drive link 11 is caused to move in a circular path, each point or coordinate of the drive link moves in a circle, in plane 31, of predetermined radius (R) (i.e., the eccentric off-set distance). Hence, each chosen point rotates about a corresponding rotational axis perpendicular to plane 31. Accordingly, by choosing the desired location of the axis of rotation, perpendicular to the circulating motion thereof (i.e., perpendicular to plane 31), and the corresponding selected point rotating about that axis, the translation may be accomplished anywhere along the drive link.

For example, FIGS. 4 and 6 illustrate that spindle shafts 23 rotate about a chosen spindle axis 17, oriented substantially perpendicular to the circular motion of eccentric drive link 11, which circulates in plane 31. A crank member 20 is mounted to a lower distal end of spindle shaft 23, proximate to eccentric drive link 11, for rotation about spindle axis 17. Crank member 20 is coupled to the drive link through off-set coupling 21 in a manner translating the circular motion of the drive link into rotational motion of the spindle shaft about spindle axis 17.

As best viewed in FIGS. 5 and 6, off-set coupling 21 is preferably provided by a crank pin 41 which rotatably engages either the crank member, the drive link or both, as the pin rotates about its pin axis 42.

Preferably, crank pin 41 extends downwardly from crank member 20 toward the drive link. Drive link 11 provides a bearing sleeve 43 formed an dimensioned for rotating receipt of crank pin 41 therein. The crank member, hence, is in bearing relationship (via, the off-set coupling) with the drive link.

To coordinate rotational motion of spindle shaft 23, the precise positioning of crank pin 41, relative spindle axis 17, is fundamental to proper operation. As mentioned above, the position of crank pin 41 must coincide with the selected point on drive link 11 which corresponds to the chosen spindle axis of rotation. That is, the off-set coupling or crank pin axis 42 is spaced from spindle axis 17 by an off-set distance (D) substantially equivalent to the distance between main eccentric axis 35 and drive axis 13 (i.e., the predetermined radius (R) of approximately 10 mm). Just as importantly, the phasing or degree of off-set between the predetermined radius (R) (i.e., the direction from drive axis 13 to main eccentric axis 35) and the off-set distance (D) (i.e., the direction from spindle axis 17 to crank pin axis 42) must be about 0° or "in-phase". Therefore, in accordance with the present invention, both the distance and direction of the off-set distance (D) are substantially equivalent to the distance and direction of the predetermined radius (R) (i.e., the same eccentric stroke and phase). As shown in the sequences of FIGS. 5A–5D and 6A–6D, the circular motion of eccentric drive link 11 manipulates crank pins 41 in a crankshaft-type motion causing corresponding spindle shafts 23 to rotate about spindle axes 17.

In the preferred embodiment of the present invention, a plurality of spindle units (FIGS. 1, 4 and 5) are positioned in-line and arranged in a similar manner to enable simultaneous in-line boring of a workpiece. It will be understood, however, that pattern boring may be just as easily accomplished by positioning the spindle units anywhere perpendicularly along the drive link without departing from the true spirit and nature of the present invention. The off-set distance and the phasing, of course, must be substantially similar for each chosen spindle axis.

FIG. 6 illustrates that each spindle shaft 23 is preferably rotatably mounted to upper projection 45 and lower projection 45', of frame member 15, in an upstanding manner through upper and lower spindle bearings 46 and 46', respectively. Accordingly, spindle axes 17 are oriented substantially parallel to and spaced-apart from drive axis 13.

It will be understood, however, that the drill axis 47 does not necessarily need to be parallel to drive axis 13 (FIG. 7). Mating bevel gears 48, 48' or the like may be employed to alter the axis of rotation of drill bit 18. Further, while both the drive shaft and the spindle shafts of the present invention are rotatably mounted to common frame member 15, the stationary mounting structures upon which the shafts are rotatably mounted may be independent of one another.

Unlike the prior art gear trains which require more costly ball bearings in the spindle bears to accommodate the higher loads, the present invention is capable a employing bushing bearings for the spindle bearings 46, 46', such as sinter bronze bearings or plastic bearings.

To further stabilize the circular motion of eccentric drive link 11, relative frame member 15, a secondary drive mechanism 50 is included spaced-apart from drive shaft 22. As best viewed in FIG. 2, secondary drive mechanism 50 includes a secondary shaft 51 rotatably mounted to frame member 15 in a similar manner as that of drive shaft 22 (i.e., through upper and lower ball bearings 26, 26' (FIGS. 6A–6D)). Moreover, secondary drive mechanism 50 similarly includes a secondary eccentric 52 coupled to secondary shaft 51 for rotation about a secondary axis 53.

A secondary eccentric axis 55 of the secondary eccentric is off-set from secondary axis 53 by a radial distance and direction substantially equivalent to the predetermined radius (R). Therefore, secondary eccentric 52 rotates about secondary axis 53 in the same eccentric path or stroke as the main eccentric 33 during rotation about drive axis 13.

Further, by positioning secondary eccentric 52 in a secondary bore 56 formed in drive link 11, the two drive eccentrics stroke in tandem to urge the drive link in the circular motion. Secondary eccentric 52, hence, stabilizes the circular motion of drive link 11 during driving rotation of drive shaft 22.

In the preferred form, an eccentric off-set link 57 communicates and cooperates with the main and secondary eccentrics to provide advantageous inertial properties about the drive axis and the secondary axis. Similar to a fly-wheel, the off-set link 57 facilitates driving rotation of the eccentric drive link during circular motion relative to the drive shaft and the secondary axis.

Briefly, as shown in FIG. 2, eccentric off-set link 57 is provided by a dog-bone-shaped link member 58 commonly coupled between secondary shaft 51 and drive shaft 22. Similar to the main and secondary eccentrics of the primary drive mechanism, eccentric off-set link 57 includes a disc-shaped first off-set eccentric 60 coupled to drive shaft 22 and a second off-set eccentric 61 coupled to secondary shaft 51. The off-set eccentrics are aligned in-phase (i.e., the same direction and distance of the respective eccentric strokes) with one another, and are coupled to link member 58 in the same manner that the main eccentric and the secondary eccentric are coupled to the eccentric drive link. That is, as each the first off-set eccentric 60 and the second off-set eccentric 61 rotates about the corresponding drive shaft 22 and secondary shaft 51, the corresponding eccentric strokes, in-phase with one another, cooperate to urge a circular motion of link member 58, relative the drive and secondary shafts.

While the off-set distance (d) (FIG. 6) of each off-set eccentric 60, 61 (i.e., the off-set distance from the drive axis 13/secondary axis 53 to the first off-set eccentric axis 62/second off-set eccentric axis 62', respectively) is not critical to proper operation, the phase shift between the off-set eccentrics and the drive mechanism eccentrics, is critical to proper operation. In other words, unlike the off-set couplings 21, the direction of the off-set distance (d) of the off-set eccentrics (i.e., the direction from drive axis 13/secondary axis 53 to the first off-set axis 62/second off-set eccentric axis 62') must be out-of-phase with the direction of the predetermined radius (R) of the drive mechanism eccentrics (i.e., the direction from drive axis 13/secondary axis 53 to the main eccentric axis 35/secondary eccentric axis 55).

Improper phasing between the off-set eccentrics and the drive mechanism eccentrics may in some instances cause the drive link to lose momentum during operation. In these instances, the off-set link actually hinders the directional circular motion of the drive link rather than facilitating it. This phenomenon occurs when the phasing between the off-set eccentrics 60, 61 and the drive eccentrics 33, 52 are at "top-dead-center" relative one another. That is, when the off-set eccentrics are in-phase (i.e., at about 0°), or at about 180° out-of-phase, with the drive mechanism eccentrics.

In the preferred embodiment, the off-set eccentrics are about 45° to about 135° out-of-phase with the drive mechanism eccentrics. Most preferably, as shown in FIGS. 5A–5D, the off-set eccentrics are about 90° out-of-phase with the drive mechanism eccentrics.

To counter balance the eccentric loads associated with the eccentric drive link 11 and eccentric off-set link 57 urged upon drive shaft 22 and secondary shaft 51, counter-balance devices 63 and 63' cooperate with the drive shaft and the secondary shaft for dynamic balancing about the drive axis and the secondary axis, respectively. Similar to tire-balancing, counter balance devices 63, 63' balance the cumulative eccentric mass between the drive link, the drive mechanism eccentrics, the link member, the off-set eccentrics and their respective bearings during rotation about their respective shafts. Without these counter-balance devices, boring apparatus 10 would experience severe vibrations during operation.

In the preferred embodiment, the counter-balance device 63 for drive shaft 22 is integrated into drive pulley 28, while counter balance device 63' is mounted to secondary shaft 51 at a position analogous to pulley 28 on the drive shaft. To provide the necessary balancing at the desired location radially about the shafts, rather than adding weight to the proper radial position, weight is removed from regions 180° opposite the correct radial position. Accordingly, as shown in FIG. 2, several holes 64, 64' are provided in pulley 28 and counter-balance device 63', respectively, in an amount necessary to effectively balance the system relative to the drive axis 13 and secondary axis 53.

While the present arrangement positions the eccentric off-set link 57 below the pulley 28 and counter-balance 63', it will be understood that the eccentric off-set link, as well as the counter-balances, may be situated anywhere vertically along the secondary and drive shaft. The counter-balance weights, of course, would slightly be different depending upon their vertical position relative the eccentrics.

What is claimed is:

1. An apparatus for rotatably operating a tool bit comprising:

an eccentric drive link;

a primary drive mechanism coupled to said drive link in an eccentric off-set manner from a drive axis of said primary drive mechanism causing circular motion of said drive link, relative said drive axis, of a predetermined radius;

a frame member;

a spindle unit rotatably mounted to said frame member for rotation about a spindle axis thereof, said spindle unit having a tool bit mounted to one end and a crank member mounted at the other end thereof;

an off-set coupling rotatably coupling said drive link to said crank member to drive said spindle about said spindle axis, said coupling being eccentrically off-set from said spindle axis by a radial distance substantially equivalent to said predetermined radius, and the eccentric off-set of said coupling being in-phase with the eccentric off-set of said drive link; and an eccentric off-set link coupled to said primary drive mechanism for circular motion about said drive axis.

2. The boring apparatus as defined in claim 1 wherein, said off-set link is further coupled to said primary drive mechanism in an eccentric off-set manner from said drive axis thereof causing circular motion of said off-set link.

3. The boring apparatus as defined in claim 2 wherein, the eccentric off-set of said off-set link with said drive axis being out-of-phase with the eccentric off-set of said drive link with said drive axis.

4. The boring apparatus as defined in claim 3 wherein, said out-of-phase is in the range of about 45° to about 135°.

5. The boring apparatus as defined in claim 4 wherein, said out-of-phase is about 90°.

6. The boring apparatus as defined in claim 4 wherein, said off-set link includes a link member and a first off-set eccentric mounted to said primary drive mechanism for rotation about said drive axis, and coupled to and having an eccentric stroke causing said circular motion of said off-set link.

7. The boring apparatus as defined in claim 6 wherein, said first off-set eccentric is cylindrical having a first off-set eccentric axis eccentrically off-set from said drive axis for rotation of said first off-set eccentric axis thereabout.

8. The boring apparatus as defined in claim 7 wherein, said first off-set eccentric is coupled to said link member in bearing relation therewith.

9. The boring apparatus as defined in claim 3 further including:

a counter-balance device mounted to said drive shaft for rotation about said drive axis, said counter-balance device cooperating with said drive link and said off-set link, and being weighted and positioned, relative said drive shaft, in a manner balancing the cumulative eccentric mass associated with said drive link and said off-set link about the respective shafts.

10. An apparatus for rotatably operating a tool bit comprising:

an eccentric drive link;

a primary drive mechanism coupled to said drive link in an eccentric off-set manner from a drive axis of said primary drive mechanism causing circular motion of said drive link, relative said drive axis, of a predetermined radius;

a frame member;

a spindle unit rotatably mounted to said frame member for rotation about a spindle axis thereof, said spindle unit having a tool bit mounted to one end and a crank member mounted at the other end thereof;

an off-set coupling rotatably coupling said drive link to said crank member to drive said spindle about said spindle axis, said coupling being eccentrically off-set from said spindle axis by a radial distance substantially equivalent to said predetermined radius, and the eccentric off-set of said coupling being in-phase with the eccentric off-set of said drive link wherein, said primary drive mechanism includes a drive shaft rotating about said drive axis, and having one end rotatably mounted to said frame member, and an opposite end coupled to a motor assembly;

said primary drive mechanism includes a drive pulley mounted to said drive shaft, and a belt coupling said motor assembly to said drive pulley; and a counter-balance device mounted to said drive shaft for rotation about said drive axis, said counter-balance device cooperating with said drive link, and being weighted and positioned, relative said drive shaft, in a manner balancing the cumulative eccentric mass associated with said drive link about said drive shaft.

11. The boring apparatus as defined in claim 10 wherein, said counter-balance device is integrated with said drive pulley.

12. An apparatus for rotatably operating a tool bit comprising:

an eccentric drive link;

a primary drive mechanism coupled to said drive link in an eccentric off-set manner from a drive axis of said primary drive mechanism causing circular motion of said drive link, relative said drive axis, of a predetermined radius;

a frame member;

a spindle unit rotatably mounted to said frame member for rotation about a spindle axis thereof, said spindle unit having a tool bit mounted to one end and a crank member mounted at the other end thereof;

an off-set coupling rotatably coupling said drive link to said crank member to drive said spindle about said spindle axis, said coupling being eccentrically off-set from said spindle axis by a radial distance substantially equivalent to said predetermined radius, and the eccentric off-set of said coupling being in-phase with the eccentric off-set of said drive link wherein, said primary drive mechanism includes a drive shaft rotating about said drive axis, and having one end rotatably mounted to said frame member, and an opposite end coupled to a motor assembly;

a secondary drive mechanism mounted to said frame member and including a secondary shaft, spaced-apart from said drive shaft, rotatably coupled to said drive link in an eccentric off-set manner from a secondary axis of said secondary shaft, the eccentric off-set thereof being substantially similar to the eccentric off-set between said drive link and said drive shaft, to stabilize said eccentric circular motion of said drive link about said predetermined radius; and an eccentric off-set link coupled between said drive shaft and said secondary shaft in an eccentric off-set manner from the respective drive axis and said secondary axis causing circular motion of said off-set link.

13. The boring apparatus as defined in claim 12 wherein, the eccentric off-set of said secondary eccentric link with drive axis and said secondary axis being out-of-phase with the eccentric off-set of said drive link with the respective drive axis and secondary axis.

14. The boring apparatus as defined in claim 13 further including:

a first counter-balance device mounted to said drive shaft for rotation about said drive axis, and a second counter-balance device mounted to said secondary shaft for rotation about said secondary axis, said first and second counter-balance devices cooperating with said drive link and said off-set link, and being weighted and positioned, relative the respective drive shaft and respective secondary shaft, in a manner balancing the cumulative eccentric mass associated with said drive link and said off-set link about the respective drive shaft and secondary shaft.

15. The boring apparatus as defined in claim 13 wherein, said out-of-phase is in the range of about 45° to about 135°.

16. The boring apparatus as defined in claim 15 wherein, said out-of-phase is about 90°.

17. The boring apparatus as defined in claim 15 wherein, said off-set link includes a link member, a first off-set eccentric mounted to said drive shaft for rotation about said drive axis, and a second off-set eccentric mounted to said secondary shaft for rotation about said secondary axis, each said first off-set eccentric and said second off-set eccentric being coupled to said link member at spaced apart locations, and each having an eccentric stroke in-phase with one another causing said circular motion of said off-set link during rotation about said secondary axis and said drive axis, respectively.

18. The boring apparatus as defined in claim 17 wherein, said first off-set eccentric is cylindrical having a first off-set eccentric axis eccentrically off-set from said drive axis for rotation of said first off-set eccentric axis thereabout, and said second off-set eccentric is cylindrical having a second off-set eccentric axis eccentrically off-set from said secondary axis for rotation of said second off-set eccentric axis thereabout.

19. The boring apparatus as defined in claim 18 wherein, said first off-set eccentric and said second off-set eccentric are coupled to said link member in bearing relation therewith.

20. A boring apparatus for drilling a plurality of aligned, equally spaced holes in a surface of a workpiece comprising:

an elongated eccentric drive link;

a primary drive mechanism including a main eccentric coupled to said drive link and mounted to a drive shaft thereof for rotation about a drive axis, said main eccentric further having an eccentric stroke causing circular motion of said drive link, relative said drive axis, of a predetermined radius;

a secondary drive mechanism including a secondary eccentric coupled to said drive link and mounted to a secondary shaft, spaced-apart from said drive shaft, thereof for rotation about a secondary axis, said secondary eccentric further having an eccentric stroke substantially similar to the eccentric stroke of said main eccentric stabilizing said circular motion of said drive link, relative said secondary axis, at said predetermined radius;

an elongated frame member positioned proximate said drive link;

a plurality of equally spaced-apart spindle units aligned in a row, and each rotatably mounted to said frame member for rotation about a respective spindle axis, each said spindle unit having a drill bit mounted to one end and a crank member mounted at the other end thereof;

a plurality of respective off-set couplings each rotatably mounted between said drive link and a corresponding crank member to drive each spindle unit about a respective spindle axis, each said coupling being eccentrically off-set from the corresponding spindle axis by a radial distance substantially equivalent to said predetermined radius, and the eccentric off-set of each said coupling being in-phase with the eccentric off-set of said drive link; and an eccentric off-set link including a link member, a first off-set eccentric mounted to said drive shaft for rotation about said drive axis, and a second off-set eccentric mounted to said secondary shaft for rotation about said secondary axis, each said first off-set eccentric and said second off-set eccentric being coupled to said link member and each having a substantially similar eccentric stroke causing eccentric circular motion of said link member during rotation of said first off-set eccentric about said drive axis and said second off-set eccentric about said secondary axis, respectively, the eccentric stroke of the first and second off-set eccentric being out-of-phase with the eccentric stroke of the main and secondary eccentric, relative the drive axis and the secondary axis, respectively.

21. The boring apparatus as defined in claim 20 wherein, said out-of-phase is in the range of about 45° to about 135°.

22. The boring apparatus as defined in claim 21 wherein, said out-of-phase is about 90°.

23. The boring apparatus as defined in claim 20 wherein, said main eccentric and said secondary eccentric are coupled to said drive link in bearing relation therewith; and said first off-set eccentric and second off-set eccentric are coupled to said link member in bearing relation therewith.

24. The boring apparatus as defined in claim 20 further including:

a first counter-balance device mounted to said drive shaft for rotation about said drive axis, and a second counter-balance device mounted to said secondary shaft for rotation about said secondary axis, said first and second counter-balance devices cooperating with said drive link and said off-set link, and being weighted and positioned, relative the respective drive shaft and respective secondary shaft, in a manner balancing the cumulative eccentric mass associated with said drive link and said off-set link about the respective drive shaft and secondary shaft.

* * * * *